United States Patent
Shahdadpuri et al.

(10) Patent No.: US 7,428,599 B2
(45) Date of Patent: Sep. 23, 2008

(54) METHOD FOR DETECTING LINK PARTNER STATE DURING AUTO NEGOTIATION AND SWITCHING LOCAL STATE TO ESTABLISH LINK

(75) Inventors: Vikas Shahdadpuri, Austin, TX (US); Marty Pflum, Austin, TX (US)

(73) Assignee: Vitesse Semiconductor Corporation, Camarillo, CA (US)

(*) Notice: Subject to any disclaimer, the term of this patent is extended or adjusted under 35 U.S.C. 154(b) by 822 days.

(21) Appl. No.: 10/754,256

(22) Filed: Jan. 9, 2004

(65) Prior Publication Data
US 2005/0198260 A1 Sep. 8, 2005

(51) Int. Cl.
*G06F 15/16* (2006.01)
*G06F 12/00* (2006.01)

(52) U.S. Cl. .................. 709/250; 709/224
(58) Field of Classification Search ......... 709/250, 709/224, 223
See application file for complete search history.

(56) References Cited

U.S. PATENT DOCUMENTS

| 6,198,727 | B1* | 3/2001 | Wakeley et al. | 370/247 |
| 6,222,852 | B1* | 4/2001 | Gandy | 370/463 |
| 6,349,331 | B1* | 2/2002 | Andra et al. | 709/220 |
| 6,457,055 | B1* | 9/2002 | Hwong et al. | 709/227 |
| 2002/0196736 | A1* | 12/2002 | Jin | 370/229 |

* cited by examiner

*Primary Examiner*—Zarni Maung
(74) *Attorney, Agent, or Firm*—Klein, O'Neill & Singh, LLP (57) ABSTRACT

Method for detecting link partner state during Auto Negotiation then switching local state to establish link. A method is disclosed for allowing a host network node to establish a compatible communication link with a link partner network node disposed on the opposite end of a physical communication link from the host network node. The host node monitors data traffic received from the link partner network node. The host node then determines from the monitored data traffic from the link partner network node if the link partner network node is requesting configuration information from the host network node. If a request for configuration information is received from a link partner network node, then the host network node is operable to facilitate an exchange of configuration information with the link partner network node to determine if each of the host network node and link partner network node have common communication capabilities that can be configured to allow compatible communication there between over the physical communication link. After either an exchange of configuration information is made and a common configuration is determined at each of the host network node and the link partner network node, or a default configuration is established, then transferring data from the host network node to the link partner node.

26 Claims, 4 Drawing Sheets

METHOD FOR DETECTING LINK PARTNER STATE DURING AUTO NEGOTIATION AND SWITCHING LOCAL STATE TO ESTABLISH LINK

TECHNICAL FIELD OF THE INVENTION

The present invention pertains in general to network interface connection devices and, more particularly, to the method of linking two network interfaces together with the use of auto negotiation, specifically that associated with fiber networks utilizing Clause 37 on a negotiation of IEEE 802.3.

CROSS-REFERENCE TO RELATED APPLICATIONS

None.

BACKGROUND OF THE INVENTION

When two network nodes are interfaced with each other over a network link, they typically do so through network interface cards (NICs) that are operable to provide the interface circuitry to allow for communication over various types of networks with varying data rates. However, when the NICs associated with network nodes on opposite ends of a network link are interfaced with each other, it is necessary that the two NICs communicate with each other in a compatible manner. Standards for the interconnection between NICs exists which define the communication protocol for transferring data there between. However, these standards continually evolve. Initially, Ethernet systems operated at a two Megabit rate, which later was replaced with a 10 Megabit rate. This evolved into a 100 Megabit rate and then into a 1,000 Megabit rate. However, each of the 10, 100 and 1,000 Megabit rates operate differently. When a network interconnection is effected, i.e., a cable is connected between two network interface cards, then a determination must be made as to the capabilities of the NIC on the other end of the communication link, the link partner. Some NICs may only operate at a 100 Megabit rate maximum whereas another NIC may operate at a 1,000 Megabit rate maximum. Thus, each NIC must define the common denominator as to the capabilities of the other NIC to determine how best to configure the link. This is facilitated with a feature called "Auto Negotiation."

For Auto Negotiation, there are a number of provisions set forth within the standards applying thereto. The primary standard that is involved with network interconnections is IEEE 802.3, which sets forth in Clause 28 thereof one type of Auto Negotiation termed "parallel detect" Auto Negotiation. This particular type of Auto Negotiation is utilized with CAT5 interconnections which facilitates a number of different modes. Another clause, Clause 37, is associated with fiber transmission, which is a serial transmission mode. This Auto Negotiation procedure of Clause 37 differs from Clause 28 Auto Negotiation in that Clause 37 Auto Negotiation does not allow for communication in certain states of the Auto Negotiation.

In Clause 37 Auto Negotiation, it is required for communication between two interfaces that Auto Negotiation either be enabled on both ends or disabled on both ends. Therefore, when a local interface, at the physical layer level, attempts to communicate with another interface, that associated with the link partner, at its physical layer level, the local interface will have its Auto Negotiation feature enabled and will expect that the link partner to have its Auto Negotiation enabled. If the Auto Negotiation is disabled on the link partner, there is no provision in Clause 37 for there to be communication between the two ends of the link. There are situations where Auto Negotiation is disabled, this existing when the link partner and local side of the link have a known communications configuration. This can be hard coded in both sides of the link. For example, when a switch constitutes the local side of the communication link and has a fiber interface to allow communication over an optical fiber, that associated with Clause 37 Auto Negotiation, it can be expected that it will be connected to a link partner having a fiber interface. When both are configured with Auto Negotiation disabled, they will communicate. However, if an attempt is made to interface an unknown device with the switch wherein the unknown device has the Auto Negotiation enabled, then communication is not possible due to the fact that the fiber interface on the switch or local side operates in accordance with Clause 37 of the standard.

SUMMARY OF THE INVENTION

The present invention disclosed and claimed herein, in one aspect thereof, comprises a method for allowing a host network node to establish a compatible communication link with a link partner network node disposed on the opposite end of a physical communication link from the host network node. The host node monitors data traffic received from the link partner network node. The host node then determines from the monitored data traffic from the link partner network node if the link partner network node is requesting configuration information from the host network node. If a request for configuration information is received from a link partner network node, then the host network node is operable to facilitate an exchange of configuration information with the link partner network node to determine if each of the host network node and link partner network node have common communication capabilities that can be configured to allow compatible communication there between over the physical communication link. After either an exchange of configuration information is made and a common configuration is determined at each of the host network node and the link partner network node, or a default configuration is established, then transferring data from the host network node to the link partner node.

BRIEF DESCRIPTION OF THE DRAWINGS

For a more complete understanding of the present invention and the advantages thereof, reference is now made to the following description taken in conjunction with the accompanying Drawings in which.

DETAILED DESCRIPTION OF THE INVENTION

Figure 1:
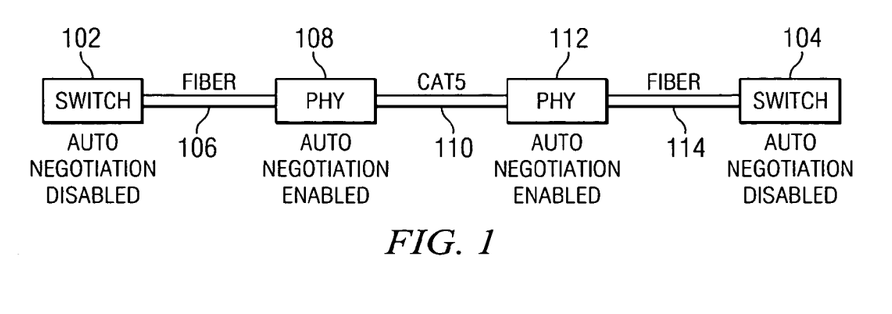
FIG. 1 illustrates an overall diagram of a configuration wherein fiber and CAT5 cable are utilized in a connection.

Referring now to FIG. 1, there is diagrammatic view of an interconnection between two ends of network. In this configuration, there is provided a switch 102 on a first end and a switch 104 on a second end. Initially, these switches 102 and 104 are configured to work with a fiber connection wherein the network interface will be a serial interface and the protocol is facilitated with a protocol termed "SerDes" which is an acronym for serializer/deserializer. In the configuration illustrated in FIG. 1, the switch 102 is connected through a fiber connection 106 to an intermediate interconnection device which has associated therewith a physical layer, PHY, 108. The switch 102 also has a PHY associated therewith, which is internal thereto in order to allow it to communicate with the PHY 108. The PHY 108 is operable to provide the physical interface to the switch 102 through the fiber 106 in a SerDes format, such that data can be received from the switch 102 serving as the link partner for the PHY 108 on the fiber side thereof, and operating in a SerDes format, and transmitted thereto. On the other side of the PHY 108 is a CAT5 interface that interfaces with a CAT5 cable 110. The CAT5 cable 110 is interfaced with the switch 104 through a second PHY 112, which PHY 112 has a CAT5 side interfaced with the cable 110 to serve as the link partner to the PHY 108 on the CAT5 side thereof, this operating with a CAT5 protocol, and a fiber side interfacing with a fiber 114, which fiber 114 is interfaced with the switch 104. The switch 104 has a PHY internal thereto operating with a SerDes protocol to serve as the link partner to the PHY 112 on the fiber side thereof. Therefore, the PHY 112 must interface with the fiber 114 in accordance with a SerDes protocol.

Since the switches 102 and 104 operate in association with a fiber connection, their Auto Negotiation process in their internal PHYs will be governed by Clause 37 of the IEEE 802.3 standard, which is incorporated in its entirety herein by reference. This Clause 37 requires that, when dealing with a SerDes interface, communication can only exist if Auto Negotiation is enabled on both ends or disabled on both ends. If one end is enabled and the other end is disabled, communication is not possible. In the configuration of FIG. 1, the embodiment illustrates a configuration where Auto Negotiation is disabled in both switches 102 and 104. This sometimes occurs due to the fact that the switches 102 and 104 do not have the capability for Auto Negotiation or, more commonly, because the Auto Negotiation feature was disabled by the system administrator. If disabled, this is done for the reason that the link partner has a known Auto Negotiation state. However, there are situations where another link partner is interfaced with the switch 102, such as the PHY 108. In this situation, the PHY 108 must be configured such that the Auto Negotiation on the fiber side is disabled; otherwise there will be no ability to communicate with the switch 102 wherein the Auto Negotiation state is in the disable state.

Figure 2:
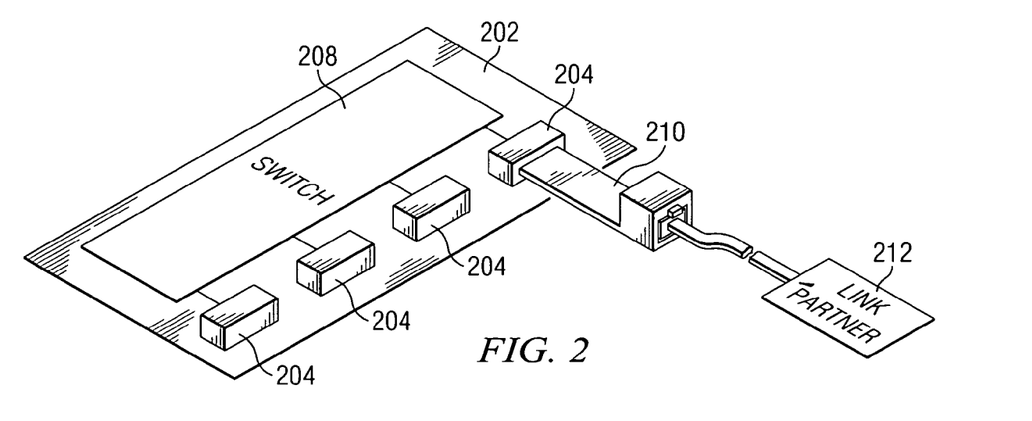
FIG. 2 illustrates a more detailed diagrammatic view of the configuration of FIG. 1 utilizing an SFP.

One application of the embodiment of FIG. 1 is illustrated in FIG. 2. In FIG. 2, there is provided a switch box 202 which has associated therein a plurality of interfaces 204 to a switch matrix 208, this switch matrix typically configured with an ASIC. Each of the interfaces 204 is operable to have an independent physical layer, which independent physical layer determines the nature of the interconnection thereto and provides the interface between the physical cable and the media side. This physical layer provides for all of the data signal conditioning, timing, clock recovery, etc., associated with receiving data from and transmitting data to the network mesh. It might be that the switch box 202 provides a number of interfaces to fiber, and a number of interfaces to CAT5 cable.

To convert from a fiber interface on the switch matrix 208 side, which is a SerDes (Serializer/Deserializer) interface, to interface with either a CAT5 cable or a fiber on the media side, an interface device disposed in what is termed as a "Small Form Factor Package" (SFP) device 210 is provided. These are well known in the art. This SFP 210 must have the ability to, on one side, interface with a SerDes protocol and, on the other side, interface with a CAT5 protocol or even another SerDes protocol for a fiber media. The SFP 210, as will be described in more detail herein below has a standard physical interface that must be converted to an interface compatible with the media. However, as noted herein above, it is unknown whether the Auto Negotiation state is disabled in the interface 204 to which the SFP 210 is interfaced. It can be seen that the ability to convert from a SerDes format to a CAT5 format, for example, allows the fiber input to the switch box 202 to be interfaced with a link partner 212 that is not fiber based, the SFP 210 providing the conversion.

Figure 3:
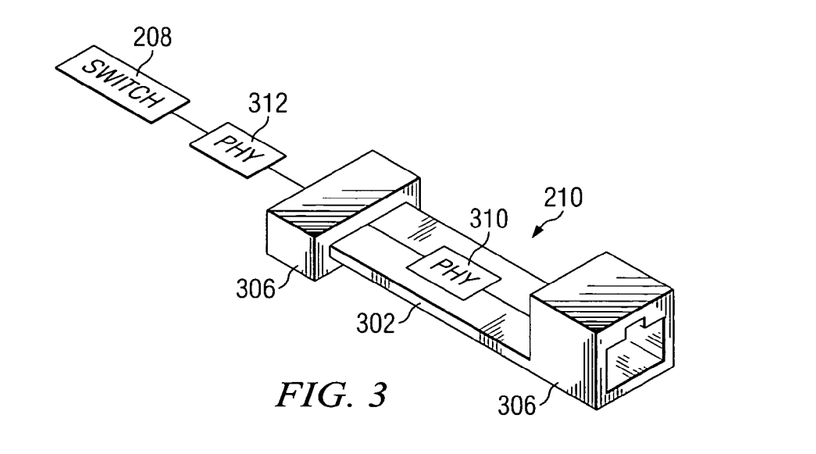
FIG. 3 illustrates a perspective view of the SFP of FIG. 2.

Referring now to FIG. 3, there is illustrated a perspective view of the SFP 210. The SFP 210 is comprised of an interface SerDes connector side 302 that interfaces with one of the connectors 204 on the switch box 202, the SFP 210 also having a CAT5 connector side 306 which interfaces with a CAT5 cable. (Note that, alternately, this could interface with a fiber). A PHY 310 is provided that is operable to provide the physical interface between the connector 306 and the SerDes connector side 302. In this embodiment, the connector side 306 is a CAT5 protocol and the SerDes connector side 302 is a SerDes protocol. Therefore, the PHY 310 is operable to interface with a PHY 312 on the switch box 202 side, which is then operable to interface with the media side, that being the switch matrix 208.

Figure 4A:
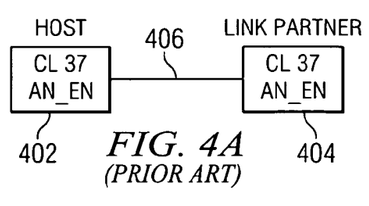
FIGS. 4A-4C illustrate the prior art operation of the standard with respect to various configurations enabled Auto Negotiation and disabled Auto Negotiation on different ends of the link.
Figure 4B:
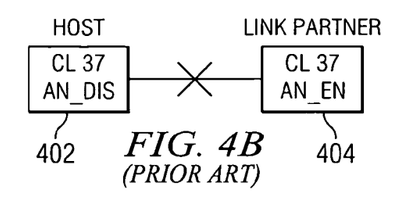
Figure 4C:
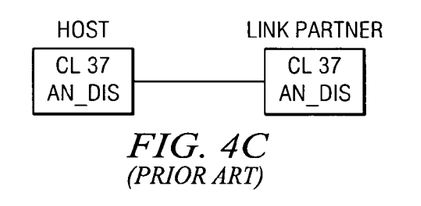

Referring now to FIGS. 4A-4C, there is illustrated a diagrammatic view of the prior art operation of Auto Negotiation. In this embodiment, there is provided a host side and a link partner side. The host side will have a physical layer 402 and the link partner side will have a physical layer 404. Each of these is operable to interface with the other through a communication link 406, which is an optical fiber. This is illustrated as a solid connection, since it provides a link. In the embodiment of FIG. 4A, the system is illustrated as operating in accordance with Clause 37 of the IEEE 802.3 standard with Auto Negotiation enabled. This provides a negotiable communication link, i.e., compatible.

In general, when dealing with Clause 37 in an optical fiber, the connection will be at the gigabit rate. Even though the interface card may be able to operate at other rates with CAT5 cable and the such, the fiber optic link will typically done at a gigabit rate. Therefore, the only thing to "negotiate" between the two is such things as whether it is full duplex, or half duplex and whether pause control is enabled. However, if either side is disabled with the other side enabled, then a communication link cannot be effected. This is illustrated in FIG. 4B wherein the host 402 is disabled and the link partner 404 is enabled with respect to Auto Negotiation. FIG. 4C illustrates the embodiment wherein Clause 37 operation has both the host 402 and the link partner 404 configured with the Auto Negotiation disabled and, therefore, Clause 37 dictates that a communication path is allowed. However, there will be no negotiating of the half duplex, full duplex and pause control features.

As will be described in more detail herein below, Auto Negotiation is a procedure wherein a configuration code word is transmitted by a host and the host is looking at the receive data for a configuration word. If both sides are sending a configuration word, when they receive the other's configuration word and Base Page containing the configuration information, they will send an acknowledgment back to the link partner or the other end of the communication link indicating such and then they will go through the process of matching capabilities. Once this is complete, then only "idle" information is transmitted. This will be described in much more detail herein below.

Figure 5A:
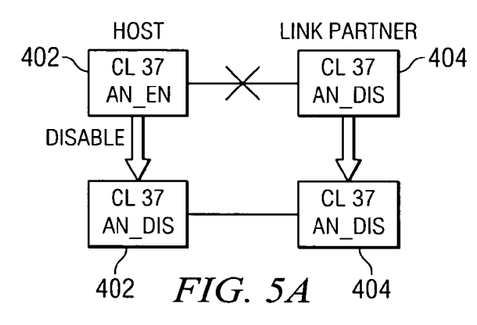
FIGS. 5A and 5B illustrate the ability to switch the Auto Negotiation state in order to effect a communication link.
Figure 5B:
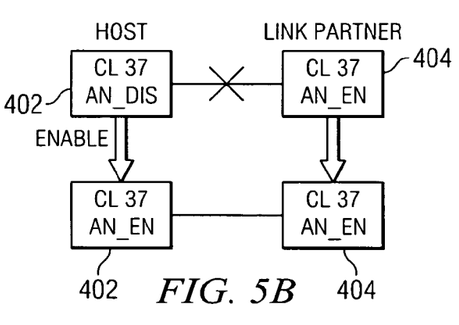

Referring now to FIGS. 5A and 5B, there is illustrated a diagrammatic view of the operation of the system of the present disclosure. In the embodiment of FIG. 5A, the host 402 is configured with its Auto Negotiation enabled and the link partner 404 is configured with its Auto Negotiation disabled, both operating under Clause 37 with a fiber interface. The host is the one of the network link terminators that has a known state for its Auto Negotiation. The connection is illustrated as being unavailable, as the link partner 404 has its Auto Negotiation disabled. However, when the connection is referred to as being "unavailable," this refers to the fact that information can be transmitted between the two ends of the link, but an effective link can not be negotiated so that data can then be transferred, i.e., the side with Auto Negotiation enabled will not recognize that there is a "compatible" link partner to communicate with. It is this lack of a compatible link partner that is referred to by the term "unavailable."

In the system of the present disclosure, once the host 402 determines that the appropriate code words are not being transmitted by the link partner 404 on the host's receive path, it will toggle its Auto Negotiation enable bit to a "0" to disable the Auto Negotiation feature and thus be placed in the "disabled" state. This will then result in the host 402 being configured with the Auto Negotiation disabled and, since the link partner 404 remains in the state with its Auto Negotiation disabled, this allows communication to be effected between the two ends of the link.

FIG. 5B illustrates the condition wherein the host 402 has the Auto Negotiation feature disabled and, for some reason, the Auto Negotiation feature of the link partner is enabled. In this condition, communication cannot be effected, as they are considered to be incompatible. In this mode, the host 402 has the ability to enable its Auto Negotiation feature such that both will be enabled to effect a compatible communication link.

Figure 6:
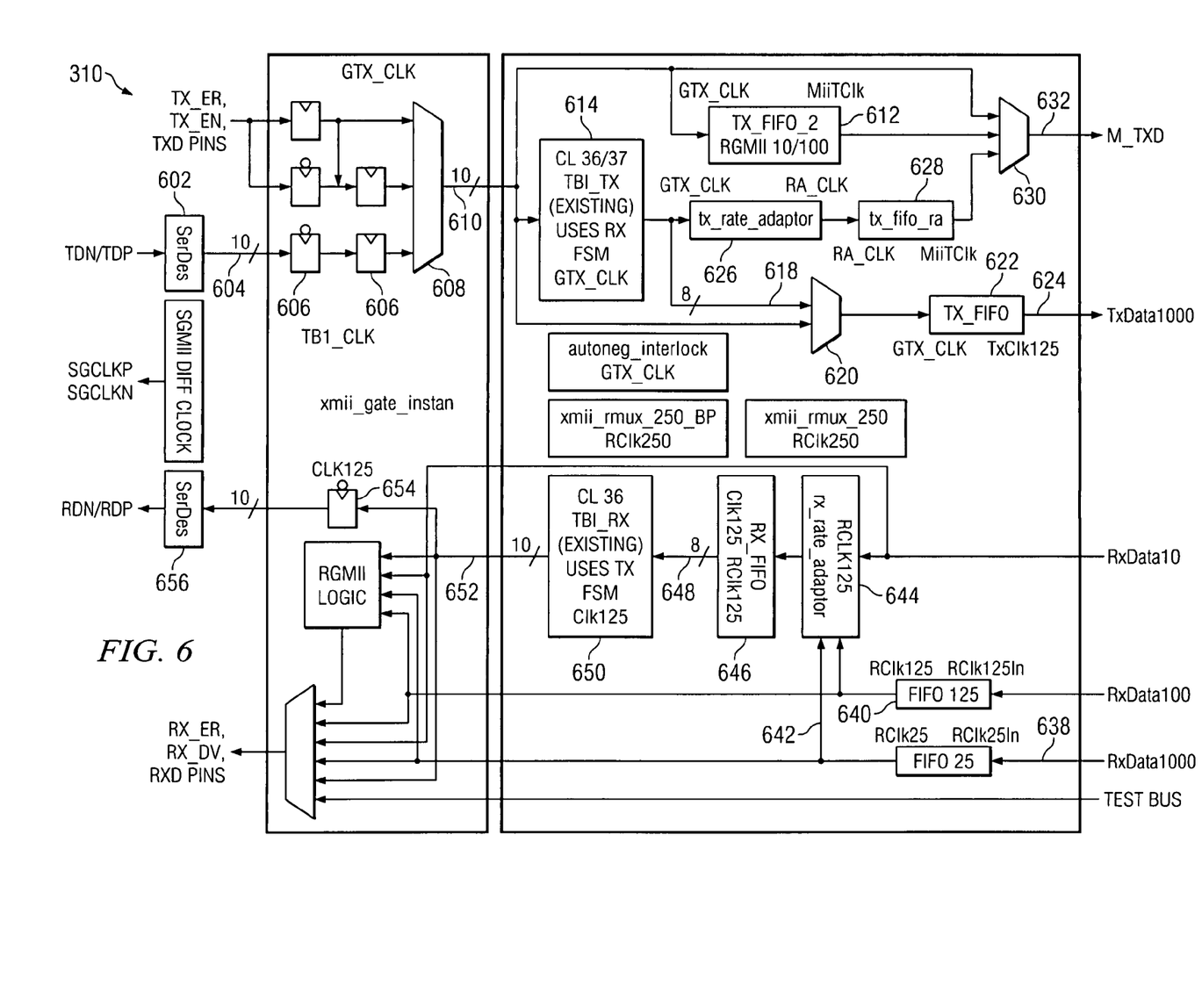
FIG. 6 illustrates a top level diagrammatic view of the interface.

Referring now to FIG. 6, there is illustrated a block diagram for the PHY 310. This is a simplified block diagram that only addresses the SerDes operation wherein SerDes operation is provided on one side of the PHY 310 and CAT5 operation is provided on the other side. However, the embodiment illustrated in FIG. 6 also provides for interface to reduced GMII (RGMII) media interface. This will not be described.

The serial data input is a TDN/TDP format which is received from the fiber in a SerDes block 602, which is a serializer/deserializer block. This is operable to receive serial data and convert it to ten bit parallel data on a bus 604. This is synchronized using clock circuitry 606 which operates on a TBI_CLK clock signal. This basically provides frame synchronization. The output of the SerDes block 602 is input to one input of a three-input multiplexer 608, the other two inputs of which are associated with the RGMII interface. For SerDes operation, the output of the SerDes block 602 on the ten bit data on bus 604 is selected. The output of the multiplexer 608 is input to a ten bit bus 610. This can be input to a transmit PHY 612 for the RGMII operation which operates at the 10/100 rate or, with in the SerDes mode, it is input to a TBI (Ten Bit Interface) transmit block 614, which is the block that is operable to perform the Auto Negotiation operation. This converts the ten bit data into eight bit data on a bus 618, which is then input to one input in a multiplexer 620, the output of which is input to a transmit FIFO 622 in order to provide elastic storage, the output thereof providing the transmit data onto a line 624 for output to a PAM-5 conversion and scrambler, which would then go to a digital-to-analog converter and eventually to the CAT5 media. The eight bit output of the TBI transmit block 614 is also input to a transmit rate adaptor block 626, which provides an output to a transmit FIFO block 628, the output of which is selected by multiplexer 630 to provide the TXB data output. The line 632 provides for the SerDes Gigabit Media Independent Interface (SGMII) mode 10/100 data rates where the source of data is 10× or 100× replicated data across the SerDes.

In the receive operation, receive data is received on a line 638 on the CAT5 side at the gigabit rate. This is input to a FIFO 640 that is clocked at a 125 megahertz rate, which is then input via a bus 642 to a receive rate adaptor 644 to a receive FIFO 646 that operates on a 125 megahertz receive clock. The output of the receive FIFO 646 is provided on an eight bit bus 648 to a TBI receive block 650 that operates under Clause 36 of the IEEE 802.3 standard to provide a ten bit output on a bus 652. This is then clocked out of the bus 652 with a clock gate circuit 654 to a serializer/deserializer block 656 to convert the parallel data to serial data and output it in an RDN/RDP format to fiber. The operation of this block is conventional, it being noted that the TBI transmit block 614 and TBI receive block 650 are utilized in the Auto Negotiation operation.

Figure 7:
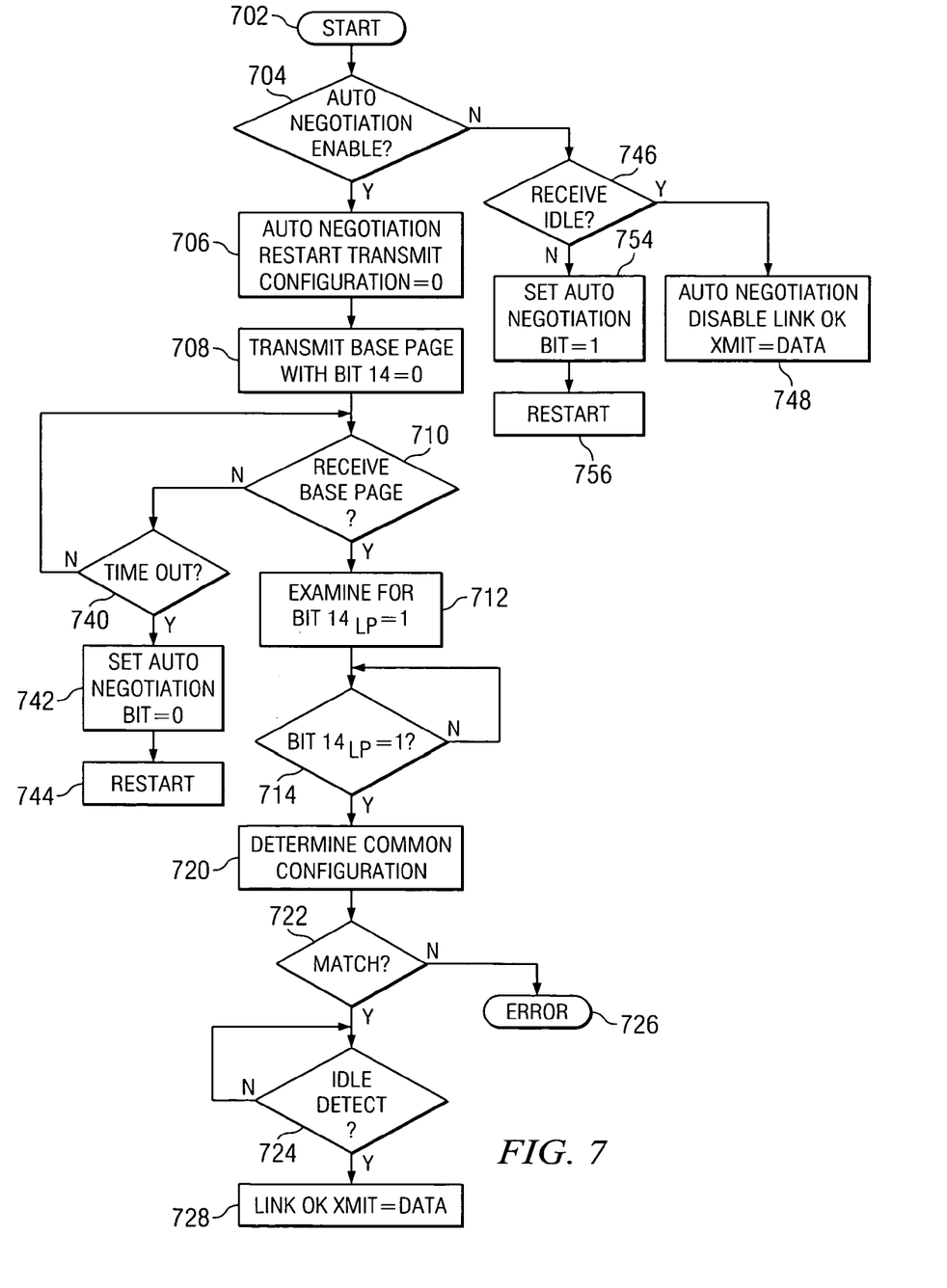
FIG. 7 illustrates a flow chart for the operation of the Auto Negotiation process.

Referring now to FIG. 7, there is illustrated a flow chart depicting the operation of the Auto Negotiation sequence. This is a conventional sequence for negotiating a compatible connection with a link partner, with some differences that allow for the switching of the Auto Negotiation state. The flow chart is initiated at a start block 702 and then proceeds to a decision block 704 to determine if Auto Negotiation is enabled in the local host system. If so, the program flows along a "Y" path to a function block 706 to restart the Auto Negotiation process, this requiring that a configuration word of all "0's" is transmitted to the communication link. This indicates the initiation of the sequence to a link partner. The program then flows to a function block 708 wherein a configuration word indicating an Auto Negotiation sequence along with a "Base Page" that contains configuration information is generated and transmitted to the link partner. This Base Page is set such that bit 14 therein, the acknowledgment bit in the Base Page, is set to a "0" to indicate no acknowledgment of having received from the link partner its Base Page. The Base Page is the configuration information that is transmitted into eight bit words, one eight bit word associated with a Lower Base Page and one eight bit word associated with an Upper Base Page. Bit 14 is the bit that is examined to determine if, when received, that the other side of the link has received its configuration word. Thus, the local host will send the Base Page out with bit 14 sent equal to "0" in order to indicate to the link partner that it, the local host, has not received a Base Page from the link partner. The program then proceeds to a decision block 710 to determine if a Base Page has been received from the link partner. If so, the program will flow along a "Y" path to a function block 712 in order to examine the Base Page for the state of the bit 14 of the link partner. The program will then flow to a decision block 714 to determine if the bit 14 has been set equal to "1." If not, the program will wait until the bit 14 has been received in a "1" state, at which time the program will flow along the "Y" path to a function block 720 to determine the common configuration. This is a step wherein a common denominator of the capabilities is determined. The program then flows to a decision block 722 in order to determine if there is a match in the capabilities. If so, the program will flow to a function block 724 to determine if idle information is being sent, this idle information being a string of idle words. If a match is not determined at decision block 722, the program will flow from decision block 722 to an error block 726. Error block 726 and the error block 718 basically perform a restart operation. When an idle detect is determined, this indicates that the link is okay, and the program closes at a function block 728 to determine that the link is okay and the transmit operation is set to transmitting of data.

If at decision block 710 it were determined that a Base Page had not been received, the program would flow along an "N" path to a time out decision block 740. If there is no time out operation, the program will continue to flow to the input of decision block 710 to await the receipt of a Base Page from the link partner. If this has not been received during several link cycles of approximately 10 ms each, the program will time out at decision block 740 and the program will flow along a "Y" path to a function block 742 wherein the Auto Negotiation bit will be set to a disabled mode, i.e., this will be the toggle operation which is not part of the Clause 37 operation. The program then flows to a function block 744 to return to the start operation at block 702.

Once disabled, the Auto Negotiation operation will then branch from the decision block 704 after a start or restart operation along the "N" path to a decision block 746. Decision block 746 determines if an idle data stream is being received. This indicates the lack of configuration words. If idle data is being received, this indicates that the Auto Negotiation function of the link partner is disabled and the program will flow along the "Y" path to a function block 748 wherein an indication will be made that operation in the Auto Negotiation disable link mode is okay, and data will be transmitted. It is noted that data is not transmitted until this Auto Negotiation sequence is processed in the TBI transmit block 614. However, if a situation occurs where the Auto Negotiation feature in the link partner were turned on, the link partner would stop transmitting data and initiate its Auto Negotiation sequence and configuration information would then be received at the host and the program would flow from the decision block 746 along an "N" path to a function block 754 wherein the Auto Negotiation bit is set to a "1," i.e., toggled, for an enable state. The program will then flow to a function block 756 indicating a restart operation which will route it back to the input of decision block 704. At this time, the program will then flow down the "Y" path from decision block 704 to determine the capability match with the link partner. It should be understood that both transmit and receive operations occur independent of each other.

Figure 8:
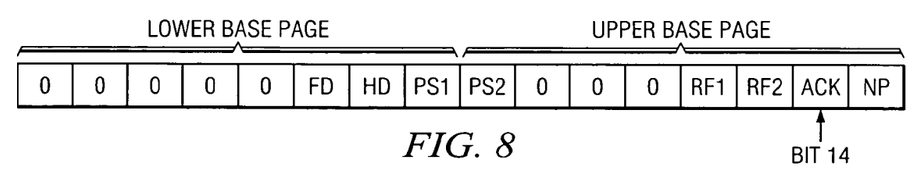
FIG. 8 illustrates a diagram of a Base Page.

Referring now to FIG. 8, there is illustrated a diagrammatic view of a Base Page, which is comprised of the Lower Base Page and the Upper Base Page. This is a conventional Base Page configuration, wherein bit 14 is the acknowledgment bit, which is set at a "0" to indicate that the receiving side has not received a code word and is set to a "1" when the receiving side has received a code word in the Base Page.

Figure 9:
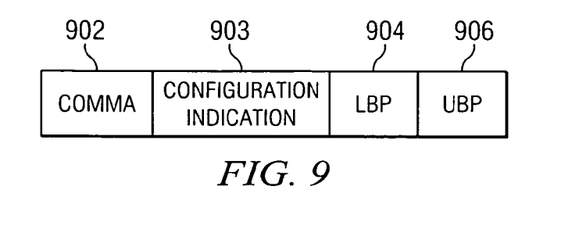
FIG. 9 illustrates a diagram of the transmitted data stream associated with a code word.

FIG. 9 illustrates the data transmission operation wherein a "comma" ten bit word 902 is transmitted followed by a configuration word 903, this followed by a Lower Base Page word 904, an eight bit word, and an Upper Base Page word 906, an eight bit word.

Although the preferred embodiment has been described in detail, it should be understood that various changes, substitutions and alterations can be made therein without departing from the spirit and scope of the invention as defined by the appended claims.

What is claimed is:

1. A method for allowing a host network node to establish a compatible communication link with a link partner network node disposed on the opposite end of a physical communication link from the host network node, the method comprising:
   monitoring data traffic received from the link partner network node;
   determining from the monitored data traffic if the link partner network node is requesting configuration information from the host network node;
   if a request for configuration information is received from a link partner network node, then the host network node is operable to facilitate an exchange of configuration information with the link partner network node to determine if each of the host network node and link partner network node have common communication capabilities that can be configured to allow compatible communication there between over the physical communication link; and
   after either an exchange of configuration information is made and a common configuration is determined at each of the host network node and the link partner network node, or a default configuration is established, then transferring data from the host network node to the link partner node;
   wherein the link partner network node and the host network node have a fixed communication protocol defined, wherein the fixed communication protocol provides for a fixed process to establish a compatible communication link;
   wherein the fixed communication protocol provides that the host network node initiate an autonegotiation sequence to establish a compatible communication link, wherein the autonegotiation sequence is executed in accordance with the fixed communication protocol, the autonegotiation sequence comprising:
      transmitting a request for configuration information from the host network node to the link partner network node;
      determining if the link partner network node has received the request for configuration information transmitted from the host network node;
      facilitating an exchange of configuration information if the link partner network node has received the request for configuration information from the host network node; and
      if the request for communication information is not received from the link partner network node, then terminating the autonegotiation sequence by disabling an autonegotiation mode and establishing the default configuration at the host network node.

2. The method of claim 1, wherein the fixed communication protocol inhibits any communication between the link partner network and the host network node if the parameters of the process are not within the fixed communication protocol, and wherein the establishing a default configuration is an operation that is outside of the fixed communication protocol.

3. The method of claim 1, wherein the link partner network node is operable to initiate a sequence substantially identical to the sequence initiated on the host network node.

4. The method of claim 1, wherein the link partner network node transmits a unique configuration code word on the physical communication link if the link partner network node is requesting configuration information from the host network node, and the host network node is operable to recognize a unique code word as a request for configuration information from a link partner network node.

5. A method for allowing a host network node to establish a compatible communication link with a link partner network node disposed on the opposite end of a physical communication link from the host network node, the method comprising:

initiating an autonegotiation sequence with the link partner network node that is used by both the host network node and the link partner network node to determine if they can operate with compatible communication parameters over the physical communication link prior to transferring data there between;

determining if the link partner node is able to initiate an autonegotiation sequence;

if the host network node determines that the link partner network node has initiated an autonegotiation sequence, then determining if each of the host network node and the link partner network node have compatible operating parameters, and, if so, transferring data thereto; and if the host network node determines that the link partner network node has not initiated an autonegotiation sequence, then terminating the host's autonegotiation sequence by disabling an autonegotiation mode and transferring data thereto.

6. The method of claim 5, wherein the determining if the link partner node is able to initiate an autonegotiation sequence comprises monitoring data traffic received from the link partner network node for autonegotiation sequence codes that are predetermined.

7. The method of claim 6, wherein:

the monitoring data traffic comprises determining from the data traffic if the link partner network node is requesting configuration information from the host network node as to its operating parameters;

if a request for configuration information is received from a link partner network node, then the host network node operable to facilitate an exchange of configuration information with the link partner network node to determine if each of the host network node and link partner network node have common communication capabilities that can be configured to allow compatible communication over the physical communication link; and after either an exchange of configuration information is made and a common configuration is determined at each of the host network node and the link partner network node, or a default configuration is established, then transferring data from the host network node to the link partner node.

8. The method of claim 5, wherein the link partner network node and the host network node have a fixed communication protocol defined, wherein the fixed communication protocol provides for a fixed autonegotiation sequence to establish a compatible communication link.

9. The method of claim 8, wherein the fixed communication protocol inhibits communication between the link partner network and the host network node if the parameters of the autonegotiation sequence are not within the fixed communication protocol, and wherein the terminating the autonegotiation sequence is an operation that is outside of the fixed communication protocol.

10. The method of claim 8, wherein the fixed communication protocol provides for the host to initiate the autonegotiation sequence for establishing a compatible communication link, wherein the autonegotiation sequence must be processed in order to comply with the fixed communication protocol, the autonegotiation sequence comprising:

transmitting a request for configuration information from the host network node to the link partner network node;

determining if the link partner network node has received the request for configuration information transmitted from the host network node;

facilitating an exchange of configuration information if the link partner network node has received the request for configuration information from the host network node; and if the request for communication information is not received from the link partner network node, then terminating the autonegotiation sequence.

11. The method of claim 10, wherein the link partner network node is operable to initiate an autonegotiation sequence substantially identical to the autonegotiation sequence initiated on the host network node.

12. The method of claim 5, wherein the link partner network node transmits a unique configuration code word on the physical communication link if the link partner network node has initiated its associated autonegotiation sequence, and the host network node is operable to recognize a unique code word as a request for configuration information from a link partner network node.

13. A method for communicating between a local network node and a link partner network node over a communication link, each operating with a predetermined network protocol, the network protocol of at least the local network node able to be configured to allow compatible data transfer therebetween, comprising:

polling, by the local network node, of the link partner network node by requesting from the link partner network node if it has the ability to configure its predetermined network protocol to that of the local network node;

determining from information received from the link partner network node if the link partner network node has the ability to configure its predetermined network protocol to that of the local network node, the local network node requiring a response from the link partner network node indicating that it has the ability to at least send information regarding its predetermined network protocol in order for the local network node to transfer data to the link partner network node;

if a determination is made that the link partner network node does not have the ability to configure its predetermined network protocol to that of the local network node, then not requiring a response from the link partner network node that it has the ability to at least send information regarding its predetermined network protocol; and transferring data to the link partner network node from the local network node;

wherein the polling and the determining comprise an Auto Negotiation sequence comprising:

sending a transmission to the link partner network node that it has initiated its Auto Negotiation process; and determining if the local network node has received, from the link partner network node, a transmission that the link partner network node has initiated its Auto Negotiation sequence;

if so, then:

sending an acknowledgment transmission to the link partner network node that the local node has received the transmission that the link partner network node has initiated its Auto Negotiation process;

determining if the link partner network node has transmitted an acknowledgment indicating that it has received the transmission from the local network node that the local network node has initiated its Auto Negotiation process and, when received, negotiating with the link partner network node network configuration information and, if necessary, to have a compatible network protocol configuration with the link partner network node, changing the network protocol configuration of the local network node to that of the link partner network node and thereafter, transferring data therebetween over the communication link; and if not, then terminating the Auto Negotiation sequence by disabling an Auto Negotiation mode.

14. The method of claim 13, wherein the communication link is an optical fiber medium.

15. A host network node with autonegotiation capability for establishing a compatible communication link with a link partner network node disposed on the opposite end of a physical communication link therefrom, comprising:

a monitoring device for monitoring data traffic received from the link partner network node;

a detector for determining from the monitored data traffic if the link partner network node is requesting configuration information;

a configuration device operable, if a request for configuration information is received from a link partner network node, to facilitate an exchange of configuration information with the link partner network node to determine if the link partner network node has common communication capabilities that can be configured to allow compatible communication over the physical communication link; and a transmission device that, after either an exchange of configuration information with the link partner node is made and a common configuration is determined at each of the host network node and the link partner network node, or a default configuration is established, is operable to transfer data to the link partner node;

wherein the link partner network node and the transmission device have a fixed communication protocol defined, wherein the fixed communication protocol provides for a fixed process to establish a compatible communication link;

an autonegotiator operable in accordance with the fixed communication protocol to initiate a sequence for establishing a compatible communication link with the link partner, wherein the sequence is processed in accordance with the fixed communication protocol, the sequence comprising:

transmitting a request for configuration information from said transmission device to the link partner network node;

controlling said detector to determine if the link partner network node has received the request for configuration information transmitted from said transmission device;

controlling said configuration device to facilitate an exchange of configuration information if the link partner network node has received the request for configuration information; and if the request for communication information is not received from the link partner network node, then terminating the sequence by disabling a autonegotiation mode and controlling said configuration device to establish the default configuration.

16. The host network node of claim 15, wherein the fixed communication protocol inhibits communication between the link partner network node and the transmission device if the parameters of the process are not within the fixed communication protocol, and wherein said configuration device is unable to establish a default configuration, as it is an operation that is outside of the fixed communication protocol.

17. The host network node of claim 15, wherein the link partner network node is operable to initiate a sequence substantially identical to the sequence initiated in said autonegotiator.

18. The host network node of claim 15, wherein the link partner network node transmits a unique configuration code word on the physical communication link if the link partner network node is requesting configuration information from said autonegotiator, and said detector operable to recognize a unique code word as a request for configuration information from a link partner network node.

19. A communication device that is capable of establishing a compatible communication link with a link partner network node disposed on an opposite end of a physical communication link from the communication device, comprising an autonegotiator operable to:

initiate an autonegotiation sequence with the link partner network node in order to determine if the link partner can operate with compatible communication parameters over the physical communication link prior to transferring data there between;

determine if the link partner node is able to initiate an autonegotiation sequence;

if the autonegotiator determines that the link partner network node has initiated an autonegotiation sequence, then determining if the link partner network node has compatible operating parameters, and, if so, transferring data thereto; and if said autonegotiator determines that the link partner network node has not initiated an autonegotiation sequence, then terminating its autonegotiation sequence by disabling an autonegotiation mode and transferring data thereto.

20. The communication device of claim 19, wherein said autonegotiator includes a detector for monitoring data traffic received from the link partner network node for autonegotiation sequence codes that are predetermined.

21. The communication device of claim 20, wherein:

said detector determines from the monitored data traffic from the link partner network node if the link partner network node is requesting configuration information from the host network node as to its operating parameters; and if a request for configuration information is received from a link partner network node, then said autonegotiator is operable to facilitate an exchange of configuration information with the link partner network node to determine if each of said autonegotiator and link partner network node have common communication capabilities that can be configured to allow compatible communication over the physical communication link;

after either, an exchange of configuration information is made and a common configuration is determined at each of said autonegotiator and the link partner network node, or a default configuration is established, then the communication device is operable to transfer data from the autonegotiator to the link partner node.

22. The communication device of claim 19, wherein the link partner network node and said autonegotiator have a fixed communication protocol defined, wherein the fixed communication protocol provides for a fixed autonegotiation sequence to establish a compatible communication link.

23. The communication device of claim 22, wherein the fixed communication protocol inhibits communication between the link partner network node and said autonegotiator if the parameters of the autonegotiation sequence are not within the fixed communication protocol, and wherein termination of the autonegotiation sequence is an operation that is outside of the fixed communication protocol.

24. The communication device of claim 22, wherein the fixed communication protocol requires said autonegotiator to initiate the autonegotiation sequence for establishing a compatible communication link, wherein the autonegotiation sequence is processed in order to comply with the fixed communication protocol, the autonegotiation sequence comprising:

transmitting a request for configuration information from said autonegotiator to the link partner network node;

further determining if the link partner network node has received the request for configuration information transmitted from the host network node;

facilitating an exchange of configuration information if the link partner network node has received the request for configuration information from said autonegotiator; and if the request for communication information is not received from the link partner network node, then terminating the autonegotiation sequence.

25. The communication device of claim 24, wherein the link partner network node is operable to initiate an autonegotiation sequence substantially identical to the autonegotiation sequence initiated on said autonegotiator.

26. The communication device of claim 19, wherein the link partner network node transmits a unique configuration code word on the physical communication link if the link partner network node has initiated its associated autonegotiation sequence, and said autonegotiator is operable to recognize a unique code word as a request for configuration information from a link partner network node.

* * * * *